United States Patent [19]

Kuperman et al.

[11] 4,355,981
[45] Oct. 26, 1982

[54] COLOR MOVING TARGET SIMULATION APPARATUS

[75] Inventors: Gilbert G. Kuperman, Dayton; Reuben L. Hann, Fairborn, both of Ohio

[73] Assignee: The United States of America as represented by the Secretary of the Air Force, Washington, D.C.

[21] Appl. No.: 272,835

[22] Filed: Jun. 12, 1981

[51] Int. Cl.³ .............................................. G09B 9/00
[52] U.S. Cl. ...................................... 434/14; 273/369
[58] Field of Search ..................... 434/14, 15, 23, 38; 273/359, 366, 367, 369, 370

[56] References Cited

U.S. PATENT DOCUMENTS

| | | | |
|---|---|---|---|
| 399,604 | 3/1889 | Dufner et al. | 273/366 |
| 724,330 | 3/1903 | Porter | 273/370 |
| 1,381,158 | 6/1921 | Barry | 434/15 |
| 2,345,744 | 4/1944 | Glenny | 434/15 |
| 2,793,038 | 5/1957 | Wallace et al. | 273/369 |
| 3,052,753 | 9/1962 | Schwarz et al. | 178/6 |
| 3,471,153 | 10/1969 | Baumler | 273/359 |
| 3,545,759 | 12/1970 | Stossl et al. | 434/23 |
| 3,668,790 | 6/1972 | Wilton | 35/12 N |
| 3,670,426 | 6/1972 | Horowitz | 35/12 N |

*Primary Examiner*—William H. Grieb
*Attorney, Agent, or Firm*—Donald J. Singer; John R. Flanagan

[57] ABSTRACT

A color moving target simulation apparatus combines an enlarged color aerial photograph with a miniature moving target to achieve an accurate simulation of a real world observation from an altitude above the moving target. The color photograph is mounted on a stationary substrate and the target is attached to an endless wire which is moved across the photograph. The wire extends between parts of a motorized pulley assembly mounted on opposite ends of a arm which may be rotatably adjusted to various positions in a plane parallel to the substrate and photograph.

5 Claims, 12 Drawing Figures

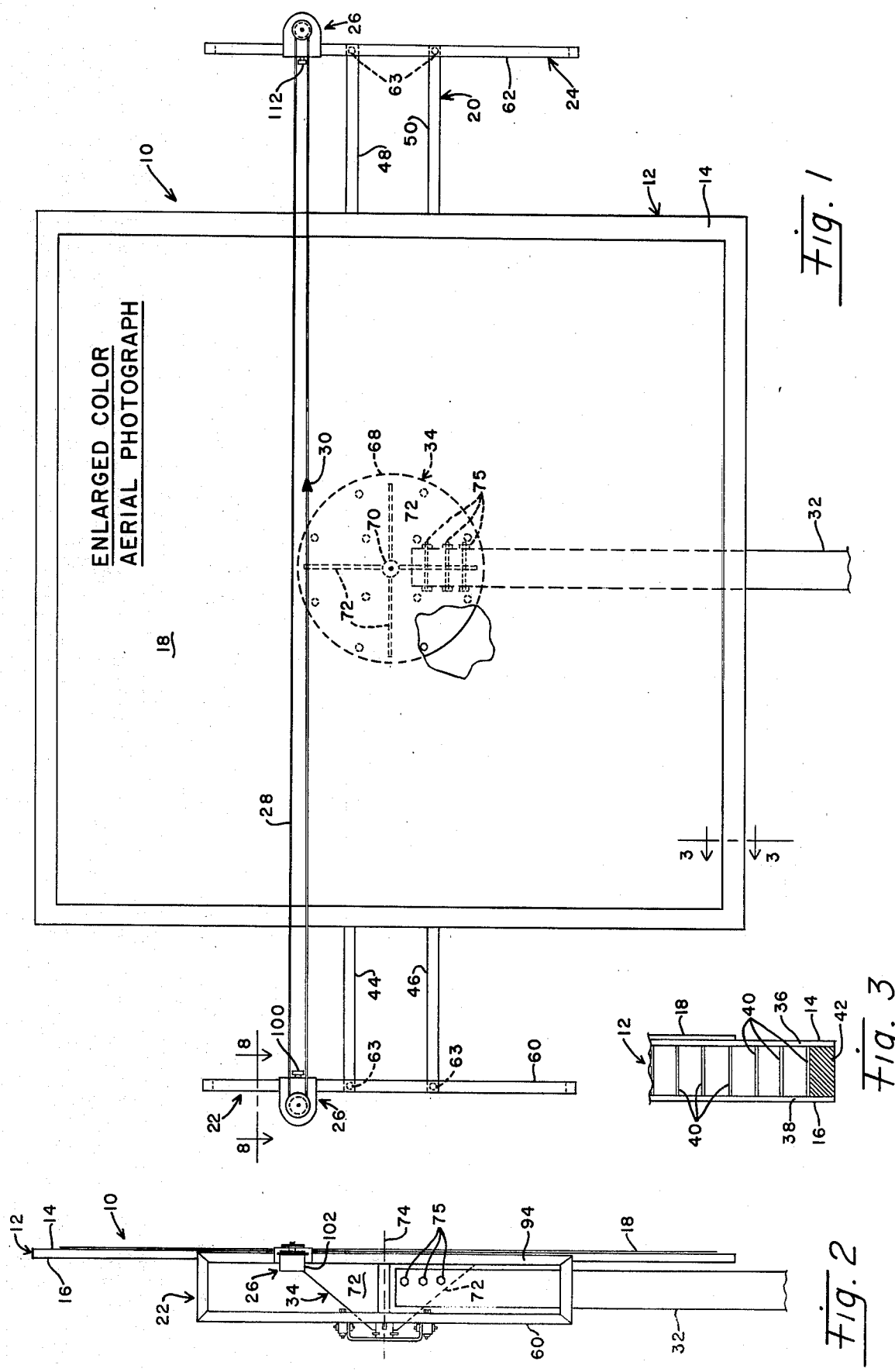

COLOR MOVING TARGET SIMULATION APPARATUS

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to simulation of a dynamic target in a real world background and, more particularly, is concerned with an apparatus which combines an enlarged color photographic background with a dynamic target model so as to recreate the scale and angular relationships present in the real world event being simulated.

2. Description of the Prior Art

The use of scale model terrain or landscape boards for simulating real world conditions is common in conjunction with various types of vehicular training apparatus. Patents to Schwarz et al., U.S. Pat. No. 3,052,753; Wilton, U.S. Pat. No. 3,668,790; and Horowitz, U.S. Pat. No. 3,670,426 relate to various simulators employing terrain models.

However, simulation techniques based on terrain boards have certain limitations. First, in order to replicate certain real world environments, the terrain board must be large in size. Therefore, the area occupied by the board will be large and consume valuable space. Second, the types of target dynamics that may be associated with a terrain board are limited, if possible at all, due to the size and irregular shapes of structures on the board.

In designing a procedure to evaluate the effectiveness of camouflage paint patterns on a low flying aircraft in enhancing its escape from visual detection by an observer in a reconnaissance aircraft eight to ten thousand feet above the camouflaged aircraft, consideration was given to utilizing a terrain board as part of the simulation apparatus. However, the above-cited limitations made use of a terrain board impractical. Visual testing during actual flights by observer and camouflaged test aircraft was also out of the question because of the high operating costs involved in aircraft usage. Different camouflage paint patterns would be tested so numerous flights would be required if actual flight testing was to be performed.

Consequently, the need arose for a testing setup which would accurately simulate real world conditions when testing observability of low flying camouflaged aircraft from a much higher reconnaissance aircraft. The testing setup needed to be versatile in that numerous tests could be repeated at low cost with different relative speeds, and at different angular relationships between the flight paths, of the observer plane and the test aircraft.

SUMMARY OF THE INVENTION

The present invention provides a color moving target simulation apparatus designed to satisfy the aforementioned needs. The unique feature of the apparatus is the combination of a large size color aerial photograph together with a dynamic miniature replica of the target, which in the case of the camouflage pattern tests was a fighter aircraft. The miniature target can be moved across the photograph in any of a variety of directions and at various speeds for simulating real world flights by the aircraft. Motion pictures of target movements can be taken at a distance from the aerial photograph which simulates vision of an observer at the desired altitude. The resulting combined dynamic target and color background may be projected to recreate the scale and angular relationships which obtain in the real world event being simulated.

Accordingly, the present invention is directed to a color moving target simulation apparatus, which comprises the combination of: (a) a substrate having generally planar front and rear sides; (b) an enlarged color aerial photograph mounted on the front side of the substrate; (c) an arm supported adjacent the rear side of the substrate and having opposite ends which extend beyond the periphery of the substrate, the arm being mounted intermediate its opposite ends for rotatable adjustment to different positions in a plane generally parallel to the planar sides of the substrate; (d) a motorized assembly mounted at the opposite ends of the arm and including a wire extending therebetween for movement along a generally linear path across the front side of the substrate and the photograph mounted thereon; and (e) a target of a size proportional to the scale of the aerial photograph and being mounted on said wire for movement therewith across the front side of the substrate and the photograph mounted thereon.

BRIEF DESCRIPTION OF THE DRAWINGS

FIG. 1 is a front elevational view of a color moving target simulation apparatus embodying the principles of the present invention.

FIG. 2 is an elevational view of the simulation apparatus as seen from the left side of FIG. 1.

FIG. 3 is an enlarged fragmentary section view taken along line 3—3 of FIG. 1 of the substrate of the apparatus with the photograph mounted thereon.

DETAILED DESCRIPTION OF THE INVENTION

Figure 6:
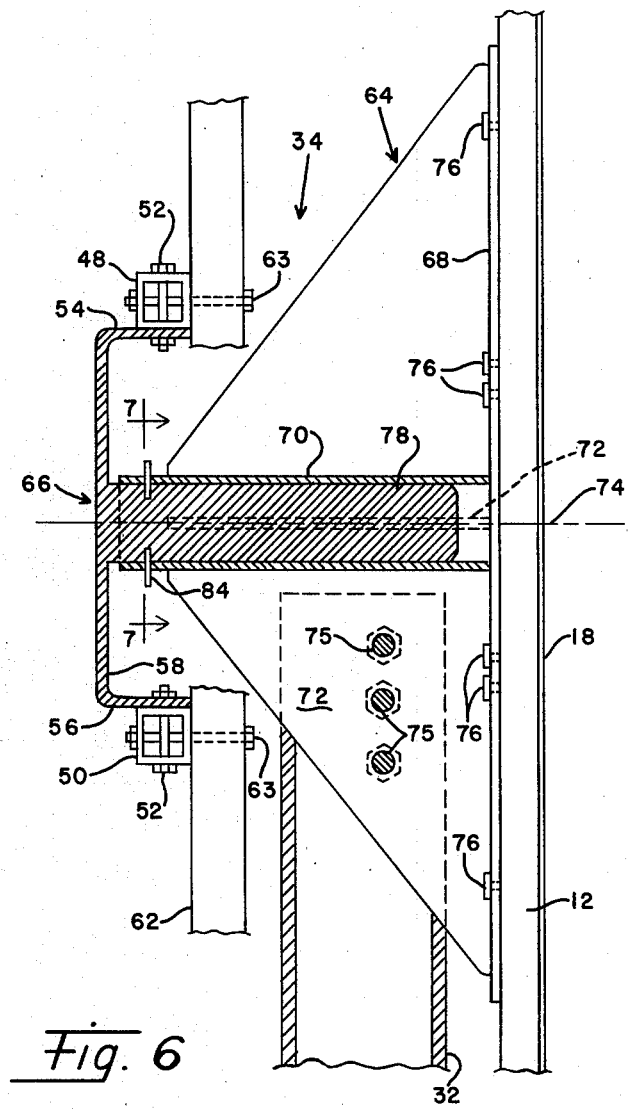
FIG. 6 is an enlarged fragmentary side elevational view, partly in section, of the coupling structure taken along line 6—6 of FIG. 5.

Referring now to the drawings, and more particularly to FIGS. 1 and 2, there is shown the preferred embodiment of the color moving target simulation apparatus of the present invention, being generally designated 10. The simulation apparatus 10 includes a substrate 12 having generally planar front and rear sides 14, 16, an enlarged color aerial photograph 18 mounted on the front side 14 of the substrate 12, an arm 20 supported adjacent the rear side 16 of the substrate 12 and having opposite ends 22, 24 which extend beyond the periphery of the substrate, a motorized assembly 26 mounted at the opposite ends 22, 24 of the arm 20 and including a wire or monofilament 28 extending therebetween, and a target model 30 attached to the wire 28.

The substrate 12 is supported in an upright or vertical orientation by a center post 32 which is attached to a structure 34 for coupling the arm 20 to the substrate. The coupling structure 34 shown in greater detail in FIG. 6 will be described later. For minimizing glare during production of a motion picture of the simulation apparatus 10 in operation, it is important that the substrate 12 be as nearly flat as possible. A honeycomb cross-sectional structure of the substrate 12, as shown in FIG. 3, builds sufficient rigidity into the substrate so as to maintain it in a flat or planar condition. In an exemplary embodiment, the honeycomb structure is comprised by front and rear parallel aluminum sheets 36, 38 of approximately 0.032 inch thickness, a series of parallel aluminum strips 40 extending between and perpendicular to the sheets, and an epoxy edge filler 42 applied between the sheets about the peripheral marginal edges thereof. In the exemplary embodiment, the substrate was seventy-six inches square in size, with a thickness of one-half inch. The enlarged color aerial photograph 18 is mounted on the front side 14 of the substrate 12 by any suitable conventional adhesive material. In the exemplary embodiment, the photograph was six feet square in size and had a scale of approximately eighty feet per inch.

Figure 5:
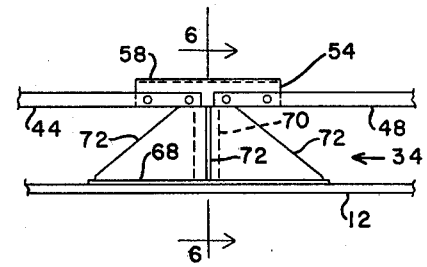
FIG. 5 is a fragmentary top plan view of a middle portion of the arm as seen along line 5—5 of FIG. 4 in conjunction with coupling structure rotatably mounting the arm to the substrate.
Figure 4:
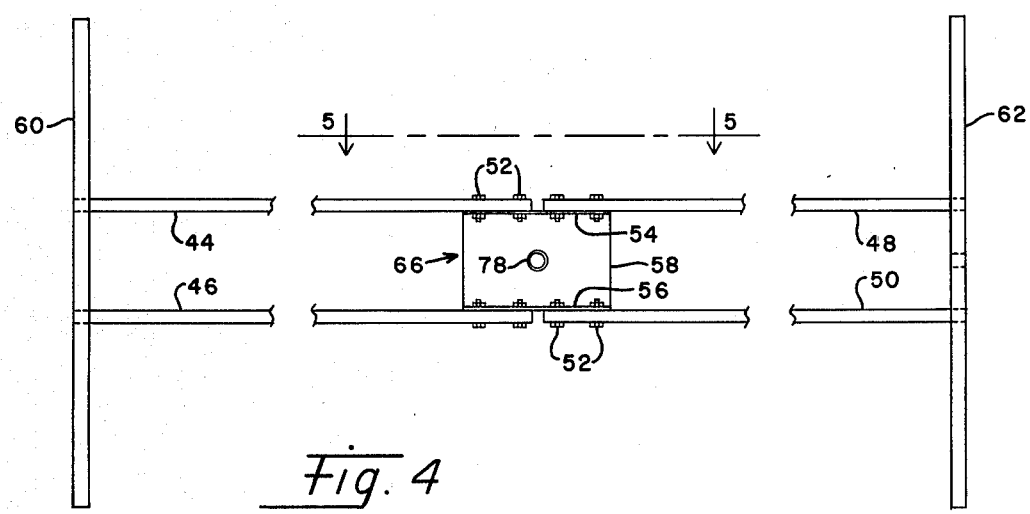
FIG. 4 is a fragmentary front elevational view of the arm of the apparatus of FIG. 1.

Referring also to FIGS. 4 through 6, the arm 20 of the simulation apparatus 10, being fabricated from aluminum tubular bar stock in the exemplary embodiment, includes aligned pairs of parallel tubular bars 44, 46 and 48, 50 connected at their inner adjacent ends by bolts 52 to upper and lower flanges 54, 56 of a U-shaped channel 58. Also, the arm 20 includes a pair of rectangular support frames 60, 62 connected to the respective outer ends of the bars 44, 46 and 48, 50 by bolts 63 so as to extend perpendicular to the bars and parallel to one another in a facing relationship.

As briefly mentioned before, coupling structure 34 mounts the arm 20 to the rear side 16 of the substrate 12. More particularly, the coupling structure 34 includes a hub assembly 64 attached to the rear side 16 of the substrate 12 and a spindle assembly 66 attached to a middle portion of the arm 20 and rotatably journaled to the hub assembly. By this arrangement, the arm 20 is mounted intermediate its opposite ends 22, 24 for rotational movement relative to the substrate 12 in a plane generally parallel to the planar sides 14, 16 of the substrate. The hub assembly 64 includes a circular base plate 68 (FIG. 1), a central tube 70 mounted on the plate 68 in perpendicular relationship thereto, and four triangular-shaped reinforcement webs 72 connecting both plate 68 and tube 70 at ninety-degree, angularly displaced and radially-extending, positions about the tube and relative to the longitudinal axis 74 (FIGS. 2 and 6) thereof. The base plate 68 is attached by screws 76 to the rear side 16 of the substrate 12. The center post 32 which supports the substrate is attached to the lower one of the webs 72 by three bolts 75. The spindle assembly 66 includes the previously mentioned U-shaped channel 58 and a central cylindrical stub shaft 78 which is attached thereto and extends in perpendicular relationship therefrom. The outer diameter of the stub shaft 78 is slightly less than the inner diameter of the hub assembly tube 70 so that the shaft 78 may be easily installed within the tube 70 for rotational movement about the tube axis 74.

Figure 7:
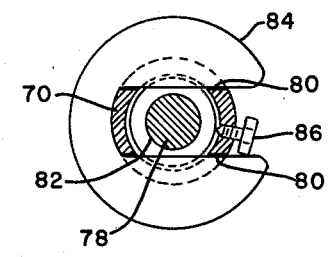
FIG. 7 is an enlarged sectional view taken along line 7—7 of FIG. 6, showing a keeper for locking interfitting portions of the coupling structure together.

As seen in FIGS. 6 and 7, for locking the spindle assembly 66 on the hub assembly 64 but still allowing rotational movement of the spindle assembly relative thereto, a pair of slots 80 are defined in the hub assembly tube 70 near its outer end and an annular recess 82 is defined in the spindle assembly shaft 78 near its inner end. When the arm 20 is rotatably mounted to the substrate 12 by installing shaft 78 in tube 70, the slots 80 and recess 82 may be aligned and a keeper or key 84 inserted therein so as to prevent longitudinal movement of the shaft 78 relative to the tube 70 while still allowing rotational movement. When it is desired to fix the arm 20 at a particular angular relationship across the substrate, a set screw 86 may be threaded into tube 70 and tightened down against the shaft 78, such as seen in FIG. 7.

Figure 9:
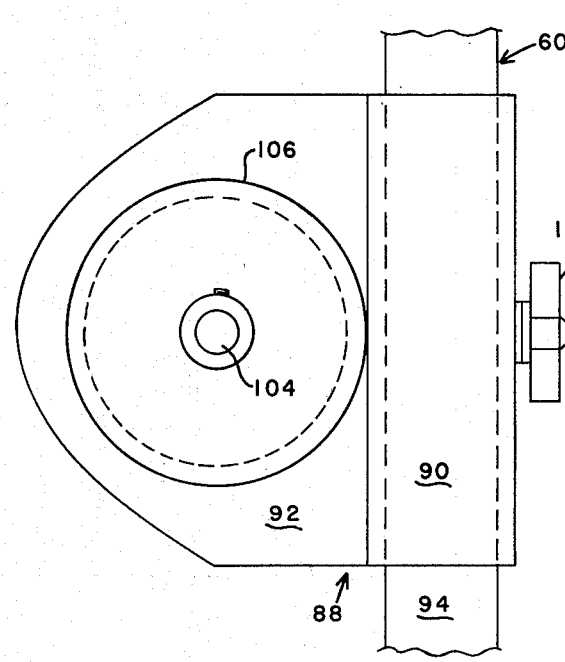
FIG. 9 is a front elevational view of the left drive pulley and motor as seen along line 9—9 of FIG. 8.
Figure 8:
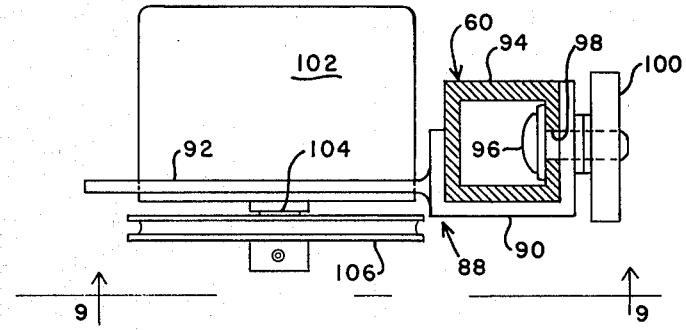
FIG. 8 is an enlarged fragmentary top plan view, partly in section, of the drive pulley and motor mounted at the left end of the arm as seen along line 8—8 of FIG. 1.

Turning now to FIGS. 8 through 11, the parts of the motorized assembly 26 mounted at the opposite ends 22, 24 of the arm 20 are shown in detail. The part of the motorized assembly 26 associated with the rectangular support frame 60 at the left end of the arm 20 is shown in FIGS. 8 and 9.

Figure 12:
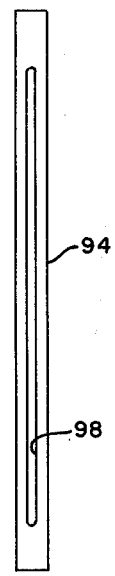
FIG. 12 is an enlarged front elevational view of a longitudinally-slotted support bar located at each opposite end of the arm for mounting the left and right pulleys.

More particularly, this part of the assembly 26 includes a mounting bracket 88 having a C-shaped channel portion 90 and a flat plate portion 92. The channel portion 90 fits on a front support bar 94 of the support frame 60 for slideable movement therealong. An adjustable fastener 96 extends through an opening in the channel portion 90 and through a longitudinal slot 98 (see FIG. 12) in the support bar 94 and may be tightened by turning knob 100 so as to fix the mounting bracket 88 at any selected position along the support bar 94. Still further, the part of the assembly 26 associated with the left rectangular support frame 60 includes an electric motor 102 mounted to the flat plate portion 92 and having a drive shaft 104 which mounts a drive pulley 106 in a plane extending parallel to and spaced in front of the photograph 18 on the substrate 12.

Figure 10:
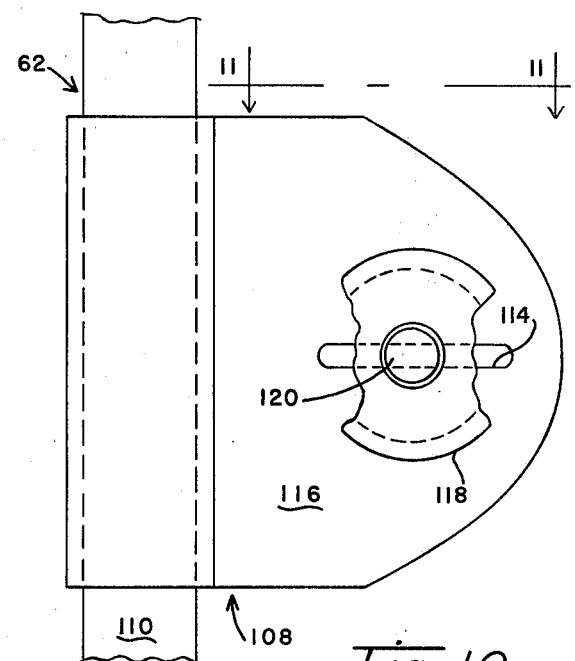
FIG. 10 is an enlarged view of the right idler pulley as seen in FIG. 1.
Figure 11:
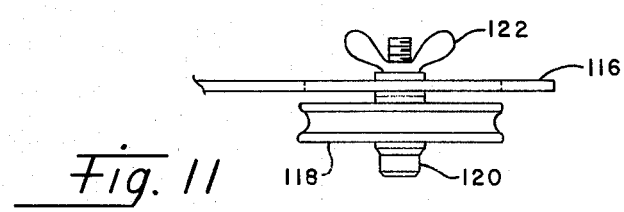
FIG. 11 is an enlarged fragmentary top plan view of the idler pulley mounted at the right end of the arm as seen along line 11—11 of FIG. 10.

The other part of the motorized assembly 26 associated with the rectangular support frame 62 at the right end of the arm 20 is shown in FIGS. 10 and 11. This part includes a mounting bracket 108 substantially identical to the mounting bracket 88 previously described. Omitted from the illustrations of this part of the assembly 26 is the adjustment fastener for changing the position of the bracket 108 along support bar 110 of the support frame 62. A knob 112 for the adjustment fastener associated with mounting bracket 108 is shown in FIG. 1. One difference between this part of assembly 26 and the part previously described is the elongated slot 114 defined in the flat plate portion 116 of the mounting bracket 108. An idler pulley 118 is rotatably mounted on a wing bolt 120 which fits through the slot 114 and is, in turn, releasably attached to the plate 116. By untightening a wing nut 122 on the bolt the pulley 118 may be moved toward or away from the pulley 106 at the left end of the arm 20. This adjustment is used for either reducing or increasing the tension on the endless loop of wire or monofilament 28 which extends between and about the pulleys 106, 118. The mounting bracket 108 supports the idler pulley 118 in the plane of drive pulley 106 so that the wire 28 extends generally parallel to the front side 14 of the substrate 12 and to the photograph 18 mounted thereon.

As seen in FIG. 1, a miniature or model target 30 is attached to the upper run of wire 28 and moves along a linear path therewith upon operation of the drive motor 102. The target 30 in an exemplary embodiment of the invention takes the form of a color, scaled photograph of a camouflaged aircraft and was approximately one inch in size. The arm 20 may be rotatably adjusted about axis 74 to just about any selected angular position relative to the substrate 12 so that practically any path of movement across the color aerial photograph 18 may be selected for the target 30. Also, the speed of the drive motor 102 may be varied so that the speed of the target can be adjusted such that the elapsed time for it to traverse the photograph can range anywhere from between 4.5 to 30 seconds. One exemplary embodiment of the drive motor is the Motormatic Motor Generator motor, model E550-000 manufactured and sold by Electro-Craft Corporation of Hopkins, Minn. In conclusion, it can be readily seen that a real world event can be accurately simulated by the apparatus 10 of the present invention wherein relative motion of the target with the background can be achieved in proportion to the scales of the photograph 18 and target 30.

It is thought that the simulation apparatus of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. Color moving target simulation apparatus, comprising:
  a. a substrate having generally planar front and rear sides;
  b. an enlarged color aerial photograph mounted on said front side of said substrate;
  c. an arm supported adjacent to said rear side of said substrate and having opposite ends which extend beyond the periphery of said substrate, said arm being mounted intermediate its opposite ends for rotatable adjustment to different positions in a plane generally parallel to said planar sides of said substrate;
  d. a motorized assembly mounted at said opposite ends of said arm and including a wire extending therebetween for movement along a generally linear path across said front side of said substrate and said photograph mounted thereon; and
  e. a target of a size proportioned to the scale of said aerial photograph and being attached to said wire for movement therewith across said front side of said substrate and said photograph mounted thereon.

2. The color moving target simulation apparatus as recited in claim 1, further comprising coupling structure for rotatably mounting said arm to said rear side of said substrate.

3. The color moving target simulation apparatus as recited in claim 2, wherein said coupling structure includes:
  a. a hub assembly attached to the rear side of said substrate; and
  b. a spindle assembly connected to a middle portion of said arm and rotatably journaled to said hub assembly.

4. The color moving target simulation apparatus as recited in claim 1, wherein said motorized assembly includes;
  a. a drive motor mounted at one end of said arm;
  a. a drive pulley attached on a drive shaft of said motor;
  c. an idler pulley rotatably mounted at the opposite end of said arm, said drive and idler pulleys being aligned in a common plane parallel to said planar front side of said substrate; and
  d. said wire extending between and around said drive and idler pulleys.

5. The color moving target simulation apparatus as recited in claim 1 or 4, wherein said arm includes a support frame at each opposite end thereof which mounts said motorized assembly for slideable adjustment along said each support frame, whereby the path of said wire across the photograph may be adjusted to a variety of different positions without rotating the arm relative to the substrate.

* * * * *